United States Patent [19]

Ide

[11] Patent Number: 5,254,893
[45] Date of Patent: Oct. 19, 1993

[54] SHAFT SUPPORT ASSEMBLY FOR USE IN A POLYGON MIRROR DRIVE MOTOR

[76] Inventor: Russell D. Ide, P.O. Box 744, 641 Arnold Rd., Coventry, R.I. 02816

[21] Appl. No.: 828,228

[22] Filed: Jan. 30, 1992

[51] Int. Cl.[5] .......................... H02K 7/08; H02K 7/14; F16C 32/06
[52] U.S. Cl. ..................................... 310/90; 384/110; 310/67 R; 359/198
[58] Field of Search ..................... 310/67 R, 90, 90.5; 384/110, 247, 249, 264; 359/198, 200

[56] References Cited

U.S. PATENT DOCUMENTS

| | | | |
|---|---|---|---|
| 3,016,274 | 1/1962 | Norris | 310/90 |
| 3,598,456 | 8/1971 | Love | 310/90.5 |
| 3,780,593 | 12/1973 | Coleman et al. | 310/90.5 |
| 4,043,612 | 8/1977 | Orcutt | 384/110 |
| 4,649,306 | 3/1987 | Yamashita | 310/90 |
| 4,734,606 | 3/1988 | Hajec | 310/90.5 |
| 4,872,659 | 10/1989 | Kato et al. | 217/9 |
| 4,875,063 | 10/1989 | Idenawa et al. | 346/160.1 |
| 4,918,306 | 4/1990 | Saito | 250/235 |
| 4,919,547 | 4/1990 | Schwartzman | 384/110 |
| 4,925,321 | 5/1990 | Maruyama et al. | 384/114 |
| 4,938,611 | 7/1990 | Nii et al. | 384/133 |
| 4,984,881 | 1/1991 | Osada et al. | 350/616 |
| 4,996,540 | 2/1991 | Motoi et al. | 346/108 |
| 5,019,738 | 5/1991 | Weilbach et al. | 310/90.5 |
| 5,173,797 | 12/1992 | Zedekar et al. | 384/110 |

FOREIGN PATENT DOCUMENTS

| | | | |
|---|---|---|---|
| 0035118 | 4/1981 | Japan | 359/200 |
| 0022115 | 2/1985 | Japan | 359/200 |
| 0143715 | 7/1986 | Japan | 359/200 |
| 0212718 | 10/1987 | Japan | 359/198 |

*Primary Examiner*—Steven L. Stephan
*Assistant Examiner*—C. LaBalle
*Attorney, Agent, or Firm*—Michael D. Bednarek; Marks & Murase

[57] ABSTRACT

A shaft support assembly particularly well suited for supporting the high speed rotor in a laser polygon mirror drive motor assembly. The rotor has conically tapered ends. These ends are supported by conical plain bearings. At least one of the bearings is adjustable with respect to the shaft and the bearing so that the gap between the shaft and bearing can be easily adjusted.

20 Claims, 3 Drawing Sheets

SHAFT SUPPORT ASSEMBLY FOR USE IN A POLYGON MIRROR DRIVE MOTOR

BACKGROUND OF THE INVENTION

1. Field of the Invention

This invention relates to a shaft support assembly for use in a polygon mirror drive motor for laser beam printers or a motor for magnetic disk equipment, VTR and the like. Laser polygon mirror drive motor assemblies present a singular set of shaft support conditions. The high speed motor must exhibit a high rotational accuracy with a minimum of shaft whirling; this is particularly true in modern laser printers where high speed and highly minute images and very dense memory are involved. The shaft support conditions are, however, quite stable. The rotor reaches its high operating speed almost instantaneously and operates at a constant speed.

2. Description of the Prior Art

It is known that problems relating to rotational accuracy and to contamination of the overall machine are directly related to performance of the shaft support assembly used to support the high speed rotor. The speed and accuracy of rotation of conventional rolling element bearings are limited by the accuracy of the working rolling members and inner and outer races. The high rotational speeds also dramatically reduce rolling element life. Consequently, rolling element bearings are not suitable for such applications. Instead, fluid-lubricated plain bearings have been employed in shaft support assemblies for laser polygon mirror drive motors. Such bearings are known to be effective in applications requiring high speed rotation and "high accuracy rotation". Of course, various improvements must be made in such plain bearing shaft support assemblies for use in mirror drive motors of the above type.

In a plain bearing shaft support assembly, a fluid lubricant film is formed between sliding surfaces upon rotation of the shaft or rotor. Unlike a gas bearing, a plain bearing is not limited to low load applications. Indeed, if a lubricating oil is used, an oil film of high rigidity which attains "high accuracy rotation" and high load capacity can be obtained. Accordingly, such plain bearings can be designed to be of a shorter length as compared with a gas bearing, thus enabling a realization of a compact motor.

There are, however, certain problems presented by the use of plain bearings in shaft support assemblies in polygon mirror drive motors. For example, in a plain bearing making use of a lubricating oil, oil leakage is always a problem, and dispersion of oil during high speed rotation poses a problem in the practical use of polygon mirror drive motors. Another problem is that plain bearings typically provide thrust or radial support, but not both. Finally, in applications demanding accurate shaft positioning the clearances in plain bearings must be accurately maintained. Manufacturing to the close tolerances required for such applications is expensive—if it is possible at all. Moreover, adjustment is particularly difficult since adjustment of one clearance can affect another clearance.

To cope with the problem of oil leakage, a magnetic fluid bearing has been proposed for use in polygon mirror drive motors. Such bearings include a permanent magnet and a magnetic fluid. The magnetic fluid serves two functions: sealing and providing lubrication. The magnetic fluid can be formed by treating magnetic powders with a surface active agent and dispersing the same in a base oil.

As noted in U.S. Pat. No. 4,938,611 to Nii et al. there are two basic types of magnetic fluid bearings. One type of magnetic fluid bearing retains a magnetic fluid on sliding bearing surfaces by magnetizing the same by a cylindrical-shaped permanent magnet. The other type of magnetic fluid bearing has a permanent magnet arranged at an end of the bearing and the permanent magnet and a permeable rotating shaft constitute a magnetic fluid sealing to have a magnetic fluid filled in a bearing section for lubrication. These two types of magnetic fluid bearings are intended for the prevention of dispersion of a magnetic fluid by magnetizing and providing the same with a sealing function.

There are, however, problems associated with such bearing constructions. These problems are discussed in detail in the aforementioned U.S. Pat. No. 4,938,611 to Nii et al.

According to Nii et al., these problems can be addressed by providing a magnetic fluid sealing which constitutes a bearing apparatus spaced away from a bearing section to provide therebetween a space which accommodates a cubical expansion of a lubricant and maintains a constant amount of a magnetic fluid in a magnetic fluid sealing section to prevent dispersion of the magnetic fluid upon rotation of high speeds. In addition, a mechanism for circulating the magnetic fluid through making use of shaft rotation is provided to prevent deterioration of performance due to temperature rise accompanied by viscous shearing of the magnetic fluid.

The shaft support assembly of Nii et al. includes a housing formed of a non-magnetizable material and having a bottom portion, a fluid lubricating type radial bearing means coaxially located in the housing and having a magnetic fluid sealing section and a radial bearing section, with a thrust bearing means provided at the bottom portion of said housing. A rotating shaft of a permeable material is rotatably supported by radial bearing means and thrust bearing means to extend through the radial bearing means, and the magnetic surface of fluid lubricant filled in the radial bearing section.

While the shaft support assembly disclosed by Nii et al. might solve the oil leakage problem experienced with previous polygon mirror motor support bearings, it fails to address the other two problems mentioned above—the need for close tolerances to permit precise alignment of the shaft and the need to provide simultaneously adjustable radial and thrust supports. As a result, the shaft support arrangement disclosed by Nii et al. is unnecessarily complex and expensive to construct. Thus, there remains a need for a simple reliable inexpensive easily adjustable bearing assembly for supporting a high speed shaft of the type used to support polygon mirrors.

SUMMARY OF THE INVENTION

The present invention relates to a polygon mirror drive motor assembly which includes an adjustable plain bearing which supports the high speed rotor on which the polygon mirror is supported. This assembly overcomes the problems experienced in conventional assemblies by providing a plain bearing assembly which offers both combined radial and thrust support and easy adjustment. With the assembly of the present invention, support in both the radial and thrust directions is simultaneously adjusted so that, at assembly, any slack in the system can be easily and quickly removed. This simplifies assembly and permits the use of component parts manufactured to less exacting tolerances.

The present invention resides, in part, in designing a workable plain conical bearing system. The advantages of such a system are apparent: one step adjustment and combined radial thrust support to name two. The greatest difficulty in getting a simple continuous conical surface combined radial/thrust bearing to work has been the need for precise adjustment and tolerances. The relationship between fluid stiffness and the gap between the bearing and rotor is critical in a simple continuous conical combined radial/thrust bearing. When the thickness of the fluid film—determined by the gap—is properly adjusted, the film has exactly the stiffness needed to support load applied by the rotor. The gap must therefore be adjusted such that under normal operating conditions the fluid film—which has a known stiffness—is thick enough to provide support. By providing a conical bearing at each end of the shaft, the hydrodynamic forces balance one another so long as the proper gap is maintained. A static system with fixed gaps is possible in certain applications, e.g., polygon mirror drive motors, because the loads are substantially constant.

Shaft support assemblies which include radial/thrust bearing arrangements include a shaft having a conical portion often referred to as a runner. The runner may be formed as a part of the shaft or formed separately and rotatably secured to the shaft. The bearing has a continuous conical surface which is similar, but not complimentary to the runner's surface since a complimentary surface would tend to seize. Generally, the bearing surface has a slightly greater diameter than the runner.

A hydrodynamic fluid is located between the surface of the shaft runner and the bearing pad surface. The fluid has a calculable fluid film stiffness or spring characteristic. This fluid film stiffness acts in opposition to the load applied by the rotor in operation. When the load applied by the rotor varies during operation, the system should include a spring or the like to vary the position of the bearing surface to accommodate variations in load. In a stable system such as a laser polygon mirror drive motor assembly, however, the position of the conical bearing surface may be fixed, if it can be accurately positioned.

When the shaft is at rest the bearing contacts the shaft runner. Because the bearing and runner have different shapes, this contact occurs along a single line (if the cone angles are equal) or discrete points. Fluid, preferably either air or liquid or another lubricant such as oil, fills the remaining space between the runner and bearing. As the shaft begins to rotate, the pressure and stiffness of the fluid increases. Under normal operating conditions, the fluid film has a calculable stiffness when the shaft is at rest. As the shaft speed approaches normal operating conditions, the fluid film stiffness increases until the shaft is lifted out of contact with the bearing. If the opposed conical bearings are accurately positioned, an equilibrium position will be reached. At equilibrium, the fluid stiffness acting on each end of the shaft exactly opposes the rotor loads and the bearing is spaced from the shaft runner and the rotor is supported on a fluid film.

The polygon mirror drive motor assembly of the present invention preferably includes a motor casing, a high speed rotor or a shaft supported within the motor casing, a motor located within the motor casing for driving the rotor and a polygon mirror secured to the rotor such that the polygon mirror is adapted to be driven with the rotor by the motor. In accordance with the present invention, the high speed rotor has two axial ends and each axial end is conically tapered. The respective tapered ends of the rotor are supported by bearing assemblies.

Each of these bearing assemblies include a conical bearing for supporting the conical end of the high speed rotor or shaft. The conical bearing is secured within a bearing housing. The conical bearing may be formed integrally with a portion or all of the bearing housing, if desired. The interior of the bearing housing is sealed except for an opening through which the conical end of the high speed rotor passes. The gap between the bearing housing and the periphery of the high speed rotor is sealed by a magnetic seal. The magnetic seal may be of any conventional form. The bearing housings are preferably substantially cylindrical and received in complimentary cylindrical openings formed in the motor casing. A locking set screw or some other means is provided to selectively fix the bearing housing in the motor casing once a desired position is found.

In accordance with the present invention, the outer cylindrical surface of at least one of the bearing housings, and preferably both, are provided with means such as fine threads to enable precise adjustment of the bearing housings. Likewise, the interior surface of the cylindrical opening formed in the motor casing is provided with complimentary fine threads such that the bearing housing can be threaded into the motor casing. This allows the position of the two bearing housings to be precisely set. If only one of the two housings is provided with an adjusting means such as the threads, the other housing is first locked into position. The position of the other, adjustable, housing is used for all fine adjustment. Once the precise position of the housing is set, the position of the housing relative to the casing is fixed through the use of a locking set screw or the like.

Because both the high speed rotor and the casing have fixed dimensions, clearances between the conical end of the high speed rotor and the conical support surface of the bearings within each bearing housing can be adjusted by simply adjusting the position of one of the bearing housings. Further, since the conical bearing provides both the radial and thrust support for the high speed rotor, this one simple mechanical adjustment results in simultaneous adjustment of the radial and thrust supports on both ends of the shaft. Moreover, the bearing components can be manufactured to less exacting tolerances because the bearing assembly can be quickly adjusted to compensate for any manufacturing errors or loose tolerances. Thus, the present invention overcomes the greatest difficulty in getting a simple continuous conical surface bearing to work—the need for precise adjustment and tolerances.

The simple fixed geometry conical bearing of the present invention works in laser polygon mirror drive motor assemblies because the conical supports at each end of the shaft work together and because of the stable operating conditions, high speed and quick start up of such assemblies. Other variables in a plain bearing system such as the stiffness of the magnetic fluid and the shape and size of the various components are all fixed. The requirement for precise tolerances is, of course, solved by the present invention.

DETAILED DESCRIPTION OF THE DRAWINGS

Figure 1:
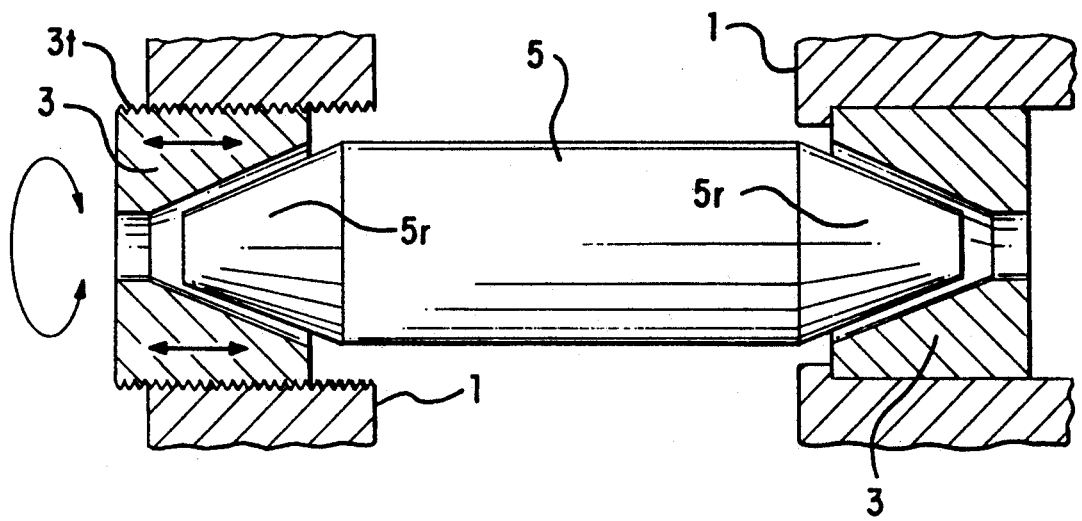
FIG. 1 is a schematic side view of a double conical plain bearing shaft support system according to the present invention.
Figure 2:
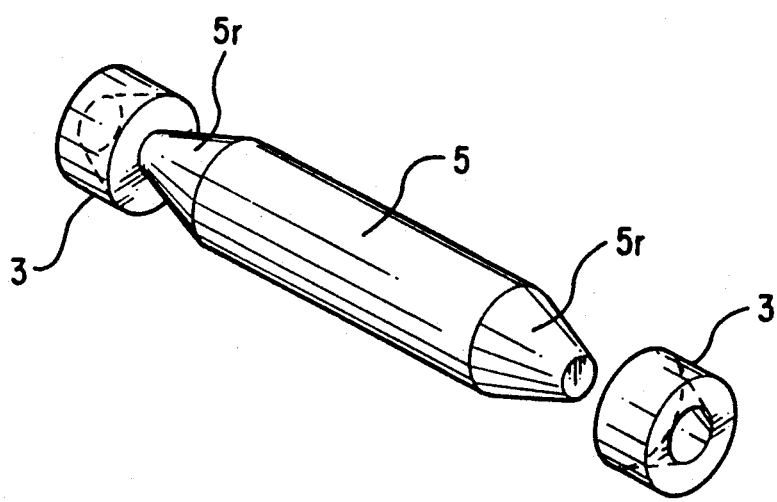
FIG. 2 is a schematic perspective view of a double conical plain bearing and a shaft having tapered ends.

The operating principles of the double conical plain bearing assembly of the present invention can be understood with reference to FIGS. 1 and 2. These figures show a simplified combined radial/thrust support assembly in which a conically shaped runner 5r is formed at each end of a shaft 5 and a pair of coaxially aligned bearing 3 each having a conical face are mounted in a housing 1 to support the runners 5r at each end. The shaft 5 is thus supported in both the radial and thrust directions. The bearings 3 for purposes of the illustration, are simple continuous conical surfaces. The bearings 3 are typically tapered at the same angle as the runner 5r but are slightly larger so that, at rest, the bearing and runner are eccentric and a wedge shaped space is formed between them. When the surfaces contact, they contact along a single line with a converging wedge shaped space extending from each side of the line of contact. The bearings 3 are precisely spaced from the ends of the shaft 5. To facilitate this, at least one of the bearings 3 is provided with threads to allow the bearing to be threaded into and out of the housing 1. Rotating the bearing in the directions indicated by arrows leads to axial displacement of the bearing 3 relative to the housing 1, the shaft 5 and the other bearing 3. Ultimately, the clearance between the shaft 5 and both conical bearings is changed by this one simple adjustment.

At rest, the bearings 3 contact the conical surfaces of the shaft runner 5r. The bearing surfaces and conical surfaces are pressed against one another by gravity. As the shaft 5 begins to rotate, the stiffness of the hydrodynamic fluid increases until the stiffness of the fluid exceeds the gravity force which causes contact between the shaft and bearing surfaces. At that point, the fluid forces the surfaces apart until an equilibrium is reached and the shaft runner 5r and shaft 5 are supported on a film of pressurized fluid. At equilibrium, the axial stiffness at each end of the shaft is balanced so that shaft position is maintained with a high degree of accuracy. The equilibrium is maintained as long as operation conditions are stable. In a laser polygon mirror drive motor, the high speed equilibrium state is reached almost immediately at start up and is maintained throughout operation.

There are several constraints faced when designing a conical bearing support system. For instance, once the fluid to be used is known, the stiffness characteristics of that fluid are fixed since they are physical characteristics. In such a case, the balance depends entirely on setting an appropriate clearance between the shaft and bearings. The clearance is preferably adjusted manually and fixed once the proper setting is found.

If the operating conditions vary, however, an automatic adjustment means should be provided. Automatic adjustment can also be used as an alternative to manual adjustment, if desired. As described in applicant's previous application Ser. No. 07/685,148 filed Apr. 15, 1991, such an automatic adjustment can be provided by a spring such as a Belleville (initially coned) spring, a spring washer and an elastomeric cushion or a beam-like support structure. In this way a very simple and reliable combined radial and thrust bearing arrangement can be provided.

Figure 3:
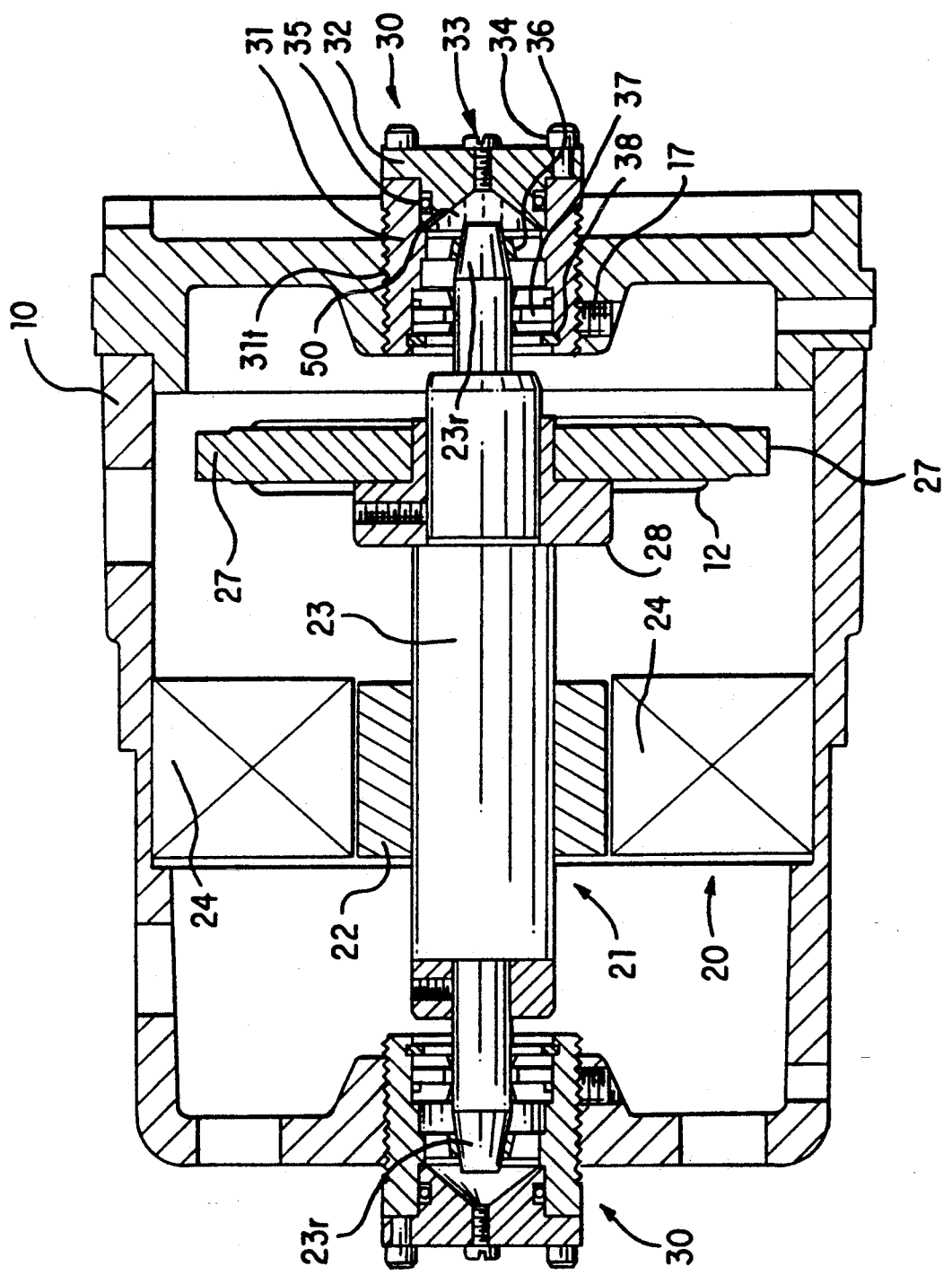
FIG. 3 is a longitudinal cross-sectional view of a first embodiment of a laser polygon mirror drive according to the present invention.

FIG. 3 shows a polygon mirror drive motor assembly for laser printers or the like. The assembly includes a casing 10 which is preferably constructed of aluminum or the like. A motor 20 is secured to the casing. The motor 20 includes a motor rotor 21 formed of a permanent magnet 22 secured to a rotor shaft 23 and a motor stator 24 secured to the motor casing 10. A polygon mirror 27 is securely mounted on the rotor 23 by a mirror retainer 28. An opening 12 is formed in the motor casing 10. The polygon mirror 27 is arranged such that a portion of the mirror 27 extends through the opening 12. In this way, the mirror can be used to reflect the laser beam in a laser printer or the like as is known.

As shown in FIG. 3, the axial ends 23r of the rotor 23 are conically tapered and rotatably supported by a pair of coaxially aligned bearing assemblies 30. In the illustrated embodiment, each bearing assembly 30 includes a bearing housing 31 having a substantially cylindrical outer periphery. As discussed below, the interior of the bearing housing should be fluid tight. In the illustrated embodiment, this is accomplished by closing one end with an aluminum cap 32. The aluminum cap is secured to the bearing housing 31 by cap bolts 34. An O-ring 35 provides a fluid tight seal between the aluminum cap 32 and the bearing housing 31. A filler screw 33 or similar device to allow access to the fluid tight interior of the housing is provided. By removing this filler screw 33 magnetic oil can be inserted into the sealed housing. The end of the housing opposite the cap is open to allow the tapered end of the high speed rotor 23 to pass into the housing and to be supported on a conical bearing 36 which is secured to the housing 31. In the illustrated embodiment, a conical bearing 36 is actually formed integrally with the housing 31. A magnetic seal 37 is mounted in the housing 31 and secured in place by a snap ring 38. The magnetic seal may be of any known construction.

At least one of the two, and preferably both, bearing housings 31 is provided with a fine thread 31t formed on the outer periphery for reasons which will be discussed hereinafter.

As discussed below, the bearing housing must be fixed in place once it is properly positioned with respect to the motor casing 10. Accordingly, in the illustrated embodiment a locking set screw 17 is provided in the motor casing 10 such that it can be screwed down to fix the bearing housing 31 into position. Naturally, any other means for releasing and locking the bearing housing with respect to the motor casing could be used for this purpose.

The conical bearing 36 is a plain bearing having a tapered surface. The angle of the taper of the conical bearing surface should be equal to the angle of taper of the end of the high speed rotor 23. The diameter of the bearing surface should, however, be slightly greater than the diameter of the conical shaft end. A supply of magnetic oil 50 is provided in the sealed interior of the housing 30.

In operation, the clearance between the conical bearing 36 and each tapered end of the high speed rotor can be precisely adjusted with ease by simply threading one or both of the housings into or out of the motor casing. Because of the conical shape of the bearing 36 and the complimentary conical shape of the ends of the high speed rotor 23, such adjustment causes simultaneous radial and axial or thrust positioning of the high speed rotor. Moreover, both ends of the rotor are adjusted by simply adjusting the housing 30 at one end. Thus, the present invention allows one-step adjustment, a feature which is very difficult in systems where the radial and thrust adjustment are separately undertaken.

Another important operational feature of the present invention is that once the bearing is precisely aligned in the position which gives optimum operation, the entire system is fixed into position so that good operation is maintained. The system is designed such that there is very little wear because when the high speed rotor is rotating there is no contact between the rotor and the conical bearing surface. Instead, the rotor is supported on a film of magnetic oil. Likewise, because of the provision of a magnetic seal which operates by providing a sealing with a layer of oil instead of with frictional contact, the system operates such that the high speed rotor is entirely supported by fluids. Additionally, because there is no slack in the system the position of the high speed rotor is accurately maintained.

Figure 4:
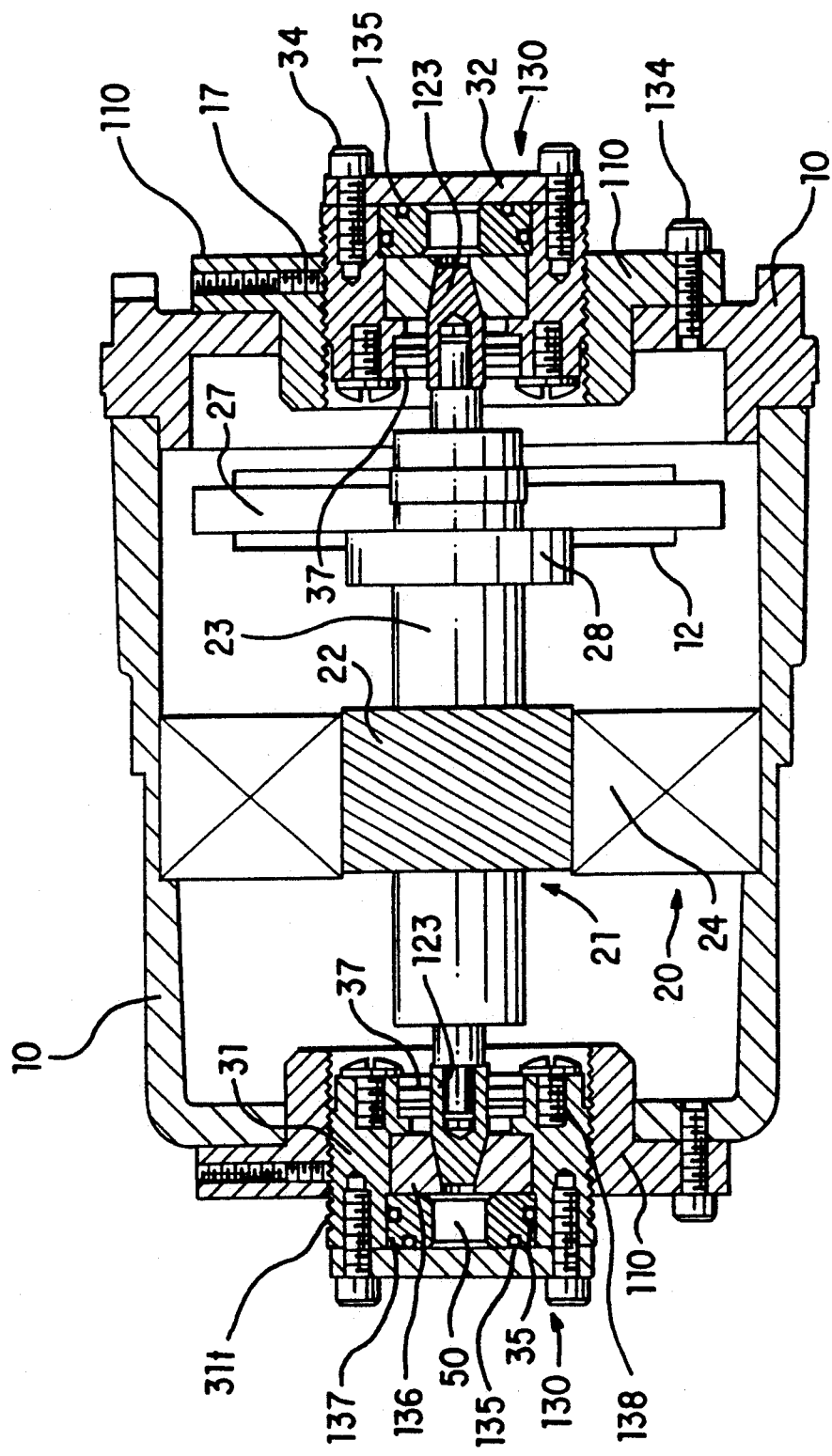
FIG. 4 is a longitudinal cross-sectional view of another last polygon mirror drive according to the present invention.

FIG. 4 shows another laser polygon mirror drive motor assembly according to the present invention. This assembly is similar to that of FIG. 3 and similar components have similar reference numerals. The assembly of FIG. 4 is, however, more suited to retrofit applications, whereas the assembly of FIG. 3 is intended to be manufactured as original equipment. Briefly, the assembly includes motor casing 10, which is preferably constructed over aluminum or the like. The casing of this embodiment includes separate end casing portions 110 formed with threaded bearing receiving openings. This type of assembly might be useful in retrofitting an existing casing to receive the bearing housings of the present invention. The end casing portions 110 are secured to the casing 10 by cup bolts 134 or the like.

A motor 20 is secured to the casing 10. The motor 20 includes a motor rotor 21 formed of a permanent magnet 22 and a rotor shaft 23 and a motor stator 24 secured to the motor casing 10. A polygon mirror 27 is rotatably secured to the rotor shaft 23 by a mirror retainer 28 or the like. An opening 12 is formed in the motor casing so that the polygon mirror 27 is visible from the outside of the casing 10 or extends outside the casing 10, as desired.

In the embodiment of FIG. 3, the axial ends of the rotor 23 are conically tapered and rotatably supported by a pair of coaxial bearing assemblies 30. In the embodiment of FIG. 4, however, the conical taper is provided by adding a separate conical end piece 123 to the rotor 23. Such a construction might be useful in retrofitting an existing rotor for use in the shaft support assembly of the present invention. The assembly of FIG. 4 also differs from the assembly of FIG. 3 in that the conical bearing 136 of FIG. 4 is formed separately from the bearing housing 30 and a sealing plug 137 is provided to maintain the conical bearing 136 in position and an O-ring 35 to provide sealing against the bearing housing 31. Unlike embodiment of FIG. 3, a second O-ring 135 is provided in the sealing plug 137. This O-ring 135 seals against the bearing housing 31 and the aluminum cap 32. If desired, the O-ring 135 can also act as an elastomeric cushion spring. This offers the possibility of using a spring load to automatically adjust bearing clearances in addition to or in lieu of manual adjustment. Finally, in the embodiment of FIG. 4 locking screws 138 are used to retain the magnetic seal assembly 37 in place instead of a snap ring as used in FIG. 3. The embodiment of FIG. 4 is otherwise similar to the embodiment of FIG. 3 and operates in essentially the same manner.

As mentioned above, FIG. 4 illustrates a construction which can be designed to have automatic clearance adjustment in addition to or as an alternative to manual adjustment. Specifically, since the conical bearing 136 is formed separate from the bearing housing 31, the conical bearing can slide axially within the housing. As shown in FIG. 4 the bearing 136 can not, however, slide closer to the rotor 23 because the housing 31 includes a flange which restricts axial movement of the bearing 136. Axial movement in the opposite direction is similarly restricted by the sealing plug 137 and the cap 32. If there are no clearances between the bearing 136, the sealing plug 137 and the cap 32, then the bearing is axially fixed within the housing. On the other hand, if there is some axial clearance between those components, the bearing 136 will be axially movable within the housing. In such a case, automatic adjustment can be achieved by appropriately providing a spring within the clearance to oppose axial movement of the bearing 136. In the embodiment of FIG. 4 the spring could be an elastic cushion such as the O-ring 135 pressing against the cap 32. Of course, other springs such as a spring washer or coil spring could be used.

As explained in co-pending application Ser. No. 07/685,148 with such a construction it is possible to provide a self adjusting bearing construction in which the bearing surface is in contact with the shaft surface when the shaft is at rest, but the two surfaces are forced apart by a pressurized fluid film when the shaft rotates under normal operating conditions. This is achieved by designing the bearings such that the force tending to push the shaft and bearing surfaces together is less than the counteracting stiffness of the fluid under normal operating conditions. At rest, the surface of the bearing 136 is in contact with the conical surface of the shaft runner 123. The two surfaces are pressed against one another by the force of the O-ring spring cushion 135 and gravity force. As the shaft 23 begins to rotate, the stiffness of the hydrodynamic fluid increases until the stiffness of the fluid exceeds the force of the spring 135 acting to push the surface of the bearing 136 into contact with the surface of the shaft runner 123. At that point, the fluid forces the surfaces apart against the bias of the spring 135 and any additional forces until an equilibrium is reached and the shaft runner 123 and shaft 23 are supported on a film of pressurized fluid.

The advantage of such a self adjusting system is that there is not need to maintain close tolerances since the fluid itself balances with the spring force and the other forces to assure proper spacing between the surface of the bearing 136 and the surface of the shaft runner 123. In arranging for an operable balance of spring force versus fluid film stiffness, there are several constraints. For instance, once the fluid to be used is known, the stiffness characteristics of that fluid are fixed since they are physical characteristics. In such a case, the balance must be provided for by selecting an appropriate spring stiffness. The spring force can be provided by any known spring such as a Belleville (initially coned) spring, a spring washer or an elastomeric cushion as shown. Regardless of the specific type of spring selected, the spring can be designed using known principles to have the necessary spring characteristic to operate as described above. In this way, a very simple and reliable combined radial and thrust bearing arrangement can be provided.

The polygon mirror drive motors constructed as described above operate in the following manner. When the rotor 23 is driven at high speeds, when the bearing apparatus of the invention is applied on a polygon mirror drive motor, the rotor is rotatably supported by an oil film of high rigidity on a conical sliding bearing, so that shaft whirling is all but eliminated and rotation of high accuracy is maintained while a polygon mirror is free from contamination due to dispersion of a fluid lubricant. In this manner, the polygon mirror drive motor can be made reliable through application of the invention.

What is claimed is:

1. A mirror drive motor assembly comprising:
    a casing:
    a motor supported within the casing, the motor comprising a stator mounted in the casing and a rotor rotatable relative to the stator, the rotor having two axial ends a mirror rotatably secured thereto at a location between the two axial ends, the rotor further comprising a shaft end extending from each axial end of the rotor, the shaft ends being coaxial and the shaft ends being conically tapered at their axial ends so as to have a continuous smooth uninterrupted conical surface;
    a pair of bearing assemblies axially mounted within the casing for supporting the respective shaft ends of the rotor;
    the bearing assemblies each comprising a housing having a shaft receiving opening formed therein for receiving the smooth conically tapered shaft ends of the rotor;
    a bearing located within the housing, the bearing having a smooth conical bearing face for supporting the conical end of the rotor shaft;
    seal means spaced from the conical bearing face for providing a seal between the bearing housing and the rotor shaft at a location axially inward of the respective conical surfaces so that the conical surfaces are enclosed within the housing in a fluid tight manner and separated from the mirror by the fluid tight housing; and
    position adjusting means for adjusting the position of at least one of the bearing assemblies relative to the casing in which it is supported so as to adjust the position of the bearings with respect to the rotor shaft.

2. The motor assembly of claim 1, comprising position adjusting means for adjusting the position of both bearing housings.

3. The assembly of claim 1, wherein the position adjusting means comprises a thread formed on the bearing housing and a complimentary threaded opening formed in the casing.

4. The assembly of claim 1 further comprising locking means for axially locking the bearing housing into position relative to the casing, the locking means comprising a set screw adapted to engage the threads of the bearing housing.

5. The assembly of claim 1, wherein the seal means comprises a magnetic seal.

6. The mirror drive motor of claim 1, further comprising a lubricant supply passage extending through the bearing housing to provide direct communication between the fluid tight interior of the bearing housing and the exterior of the mirror drive motor assembly, so that lubricant can be supplied to the fluid tight interior of the housing without disassembling the assembly and means for selectively sealing the lubricant supply passage to ensure the fluid tightness of the housing.

7. A mirror drive motor assembly comprising:
    a motor casing;
    a rotor, the rotor including a shaft having opposed conically tapered axial ends, the tapered axial ends having an entirely smooth uninterrupted surface;
    a pair of coaxial bearing assemblies supported by the motor casing for supporting the opposed conically tapered axial ends of the rotor;
    a motor located within the motor casing for driving the rotor; and
    a mirror rotatably secured to the rotor at a location between the axial ends of the rotor;
    each of the bearing assemblies comprising a bearing housing, a conical bearing located within the bearing housing and secured to the bearing housing for axial movement therewith, a shaft receiving opening formed in the bearing housing to allow the conical ends of the rotor to pass into the bearing housing, seal means for providing a seal between the bearing housing and the rotor shaft end at a location axially between the mirror and the tapered axial end of the rotor such that the interior of the bearing housing is substantially fluid tight and the conical bearing and tapered axial end of the rotor are located entirely within the sealed interior of the bearing housing and separated from the mirror by the seal means, a supply of lubricant retained in the bearing housing, the conical bearing within the housing supporting a conical end of the rotor for both radial and thrust loads;
    wherein at least one of the bearing housings is provided with adjusting means for adjusting the axial position of the conical bearing relative to the motor casing so as to adjust the clearances between the two conical bearings and between each conical bearing and the rotor.

8. The mirror drive motor assembly of claim 7, wherein both bearing housings include adjusting means.

9. The mirror drive motor assembly of claim 8, wherein threads are formed on the exterior of both bearing housings and both bearing housings are received in threaded bores in the motor casing such that both bearing housings can be threaded into and out of the motor casing.

10. The mirror drive motor assembly of claim 7, wherein the adjusting means comprise threads formed on the outer periphery of the bearing housing and corresponding complimentary threads formed in the motor casing such that the bearing housing can be threaded into and out of the casing to adjust the axial position of the bearing housing relative to the casing.

11. The mirror drive motor assembly of claim 7, wherein the conical plain bearing is formed integrally with the bearing housing.

12. The mirror drive motor assembly of claim 7, further comprising a locking means for releasibly axially locking the bearing housings into place relative to the motor casing.

13. The mirror drive motor assembly of claim 7, further comprising a locking screw threaded into the motor casing for selectively locking the bearing housing into place relative to the motor casing.

14. The mirror drive motor assembly of claim 7, wherein the mirror is a polygon mirror.

15. A mirror drive motor assembly comprising:
a motor casing;
a rotor, the rotor including a shaft having opposed conically tapered axial ends;
a pair of coaxial bearing assemblies supported by the motor casing for supporting the opposed conically tapered axial ends of the rotor;
a motor located within the motor casing for driving the rotor; and
a mirror rotatably secured to the rotor at a location between the conically tapered axial ends of the rotor;
each of the bearing assemblies comprising a bearing housing, a conical bearing located within the bearing housing and axially movable within the bearing housing, a shaft receiving opening formed in the bearing housing to allow the conical ends of the rotor to pass into the bearing housing, seal means for providing a seal between the bearing housing and the rotor shaft at a location between the tapered axial end of the rotor and the mirror such that the interior of the bearing housing is substantially fluid tight and the conical bearing and tapered axial end of the rotor are located entirely within the sealed interior of the housing and separated from the mirror by the seal means, a supply of lubricant retained in the bearing housing, the conical bearing within the housing adapted to support the conical end of the rotor for both radial and thrust loads;
a spring acting between the housing and the conical face of the bearing, the spring biasing the conical face of the bearing toward the conical end of the rotor, the spring having a predetermined stiffness;
a fluid film located between the conical face of the bearing and the conically shaped surface of the runner, the fluid film having a characteristic stiffness, wherein under normal operating conditions, the stiffness of the fluid film is greater than the stiffness of the spring such that the fluid film causes the bearing to move away from the rotor.

16. The mirror drive motor assembly of claim 15, wherein at least one of the bearing housings is provided with adjusting means for adjusting the axial position of the bearing assembly relative to the motor casing so as to adjust the clearances between the two conical bearings and between each conical bearing and the rotor.

17. The mirror drive motor assembly of claim 16, wherein the adjusting means comprise threads formed on the outer periphery of the bearing housing and corresponding complimentary threads formed in the motor casing such that the bearing housing can be threaded into and out of the casing to adjust the axial position of the bearing housing relative to the casing.

18. The mirror drive motor assembly of claim 16, further comprising a locking means for releasibly axially locking the bearing housings into place relative to the motor casing.

19. The mirror drive motor assembly of claim 16, further comprising a locking screw threaded into the motor casing for selectively locking the bearing housing into place relative to the motor casing.

20. The mirror drive motor assembly of claim 15 wherein each of the conically tapered axial ends of the rotor has a smooth uninterrupted conical surface.

* * * * *